United States Patent [19]

Gratani et al.

[11] 4,042,764

[45] Aug. 16, 1977

[54] PHOTODEGRADABLE POLYMERIC COMPOSITIONS HAVING HIGH THERMAL STABILITY CONTAINING A HALOGENATED QUINONE AND A TRANSITION METAL COMPOUND

[75] Inventors: Francesco Gratani, Sesto S. Giovanni (Milan); Marco Binaghi, Milan, both of Italy

[73] Assignee: Montedison S.p.A., Milan, Italy

[21] Appl. No.: 589,891

[22] Filed: June 24, 1975

[30] Foreign Application Priority Data

July 3, 1974 Italy ................................ 24765/74

[51] Int. Cl.² ............................................. C08J 3/20
[52] U.S. Cl. ................................... 526/4; 260/45.7 R; 260/DIG. 43; 526/1; 526/5
[58] Field of Search ................. 260/DIG. 43, 45.7 R, 260/94.9 GL; 526/1, 4, 5

[56] References Cited

U.S. PATENT DOCUMENTS

| 3,300,462 | 1/1967 | Guzzetta et al. | 260/DIG. 43 |
| 3,331,811 | 7/1967 | Schafer | 260/45.7 R |
| 3,767,648 | 10/1973 | Johnson | 260/DIG. 43 |
| 3,790,509 | 2/1974 | Diehr | 260/45.7 R |
| 3,797,690 | 3/1974 | Taylor et al. | 260/DIG. 43 |
| 3,825,627 | 7/1974 | McGaugh | 260/DIG. 43 |
| 3,852,227 | 12/1974 | Matsuda et al. | 260/DIG. 43 |
| 3,888,804 | 6/1975 | Swanholm et al. | 260/DIG. 43 |
| 3,935,141 | 1/1976 | Potts et al. | 260/DIG. 43 |

*Primary Examiner*—Eugene C. Rzucidlo
*Attorney, Agent, or Firm*—Hubbell, Cohen, Stiefel & Gross

[57] ABSTRACT

Disclosed are photodegradable and thermostable polymeric compositions based on a vinyl or vinylidene polymer such as polyethylene or polypropylene, at least one compound of a transition metal which is soluble in said polymer and which has photodegrading properties with respect to the polymer and at least one halogenated p-quinoid compound.

10 Claims, 2 Drawing Figures

PHOTODEGRADABLE POLYMERIC COMPOSITIONS HAVING HIGH THERMAL STABILITY CONTAINING A HALOGENATED QUINONE AND A TRANSITION METAL COMPOUND

BACKGROUND OF THE INVENTION

1. Field of the Invention

The present invention relates to photodegradable and thermostable compositions based on homopolymers and copolymers of vinyl or vinylidene monomers, such as polyethylene, polypropylene, polyisobutene, polystyrene, polyvinyl chloride and ethylenepropylene copolymers.

2. The Prior Art

It is quite well known that vinyl and vinylidene polymers are widely used as packaging materials in the form of films or in the form of containers of different types. It is also well known that the stability of such packagings with the passage of time is rather high, so much so as to cause serious environmental pollution problems due to the lack of an efficient system for the gathering and destruction of such materials. The environmental pollution caused by the residues of these packaging materials may be avoided by the use of degradable materials that decay under atmospheric conditions or under biological attack.

In particular, the degradability of vinyl or vinylidene polymers under the photochemical action of sunlight may usually be enhanced by mixing such polymers with photosensitizing substances. Photosensitizing substances which are in common use at present, are salts of the transition metals and compounds containing particular chromophore groups such as carbonyls or double bonds. The presence of such substances in the polymeric composition accelerates the photooxidation of the polymeric chain, with consequent degradation thereof. This degradation may in fact proceed to the point of reducing the manufactured article to a fine dust, and possibly up to the point of reducing the molecular weight of the polymeric material to values that are low enough for subsequent biological degradation.

In general, it is known that a photodegrading action will be exerted on the above-noted polymers by transition metal compounds. Specifically, such action will be exerted by all transition metal compounds that are soluble in the polymer and in which the transition metal has an atomic number between 21 and 30, 40 and 47 and 57 and 79 inclusive, wherein the binder or anion that is chemically bound to the metal, does not itself possess intrinsic photostabilizing properties. As examples of such compounds, mention may be made of the stearates, naphthenates, laurates, palmitates, oleates, sulphonates, phenolates, phosphonates, phosphites, oxides, acetyl acetonates, dibenzoylacetonates, alkylthiocarbamates, complexes with hydroxybenzophenone, cyclopentadiene, mono- and polyamines, oximes, ketones and thioketones, hydrazines, azo-compounds, etc. of copper, titanium, cobalt, iron, nickel manganese, chromium, niobium, molybdenum, cerium, tungsten, etc. The compounds of the above-described type and their photodegrading properties with regard to vinyl and vinylidene polymers, are both quite well known in the art. They are described in, for example, German Patent Application No. 2,136,704. The majority of the above transition metal compounds which act as photodegrading agents, have, however, a deleterious action on the thermal stability of the vinyl and vinylidene polymers.

On the other hand, since the processing of these polymers and their transformation into manufactured articles take place at high temperatures, the presence of highly thermodegradable substances such as the transition metal compounds, causes degradation of the polymer in the processing stage, as a result of which there are obtained products possessing rather poor physical-mechanical properties.

It is, of course, known that one may hinder or slow down the thermal degradation of a polymer by adding to the polymer suitable substances which act as thermal stabilizers. For this purpose, there are commonly used aromatic amines, such as phenyl-1-naphthylamine and N'N'-diphenyl-p-phenylenediamine, certain aryl phosphites, such as triphenylphosphite, phenols such as 2,2'-methylenbis(4-methyl-6-t-butylphenol), 2,6-di-t-butyl-paracresol, 4,4'-thiobis(2-methyl-6-t-butylphenol), and other organic compounds of different types.

In general, it may happen, however, that the addition of a thermal stabilizer will reduce the photodegrading action of the transition metal compound. Thus, in most instances it becomes necessary to effect a compromise between thermal stability and photodegradability, using particular ratios between the transition metal compound and the thermal-stabilizing agent.

It is an object of the present invention to overcome these problems of the prior art, and in accordance with the invention as will be hereinafter described, this has been achieved.

BRIEF DESCRIPTION OF THE DRAWING

FIG. I is a graphical representation of the oxygen absorbing capacity of the polymeric compositions of the invention; and FIG. II is a graphical representation of the variation with time of the carbonyl content of the polymeric compositions of the invention.

SUMMARY OF THE INVENTION

Figure 1:
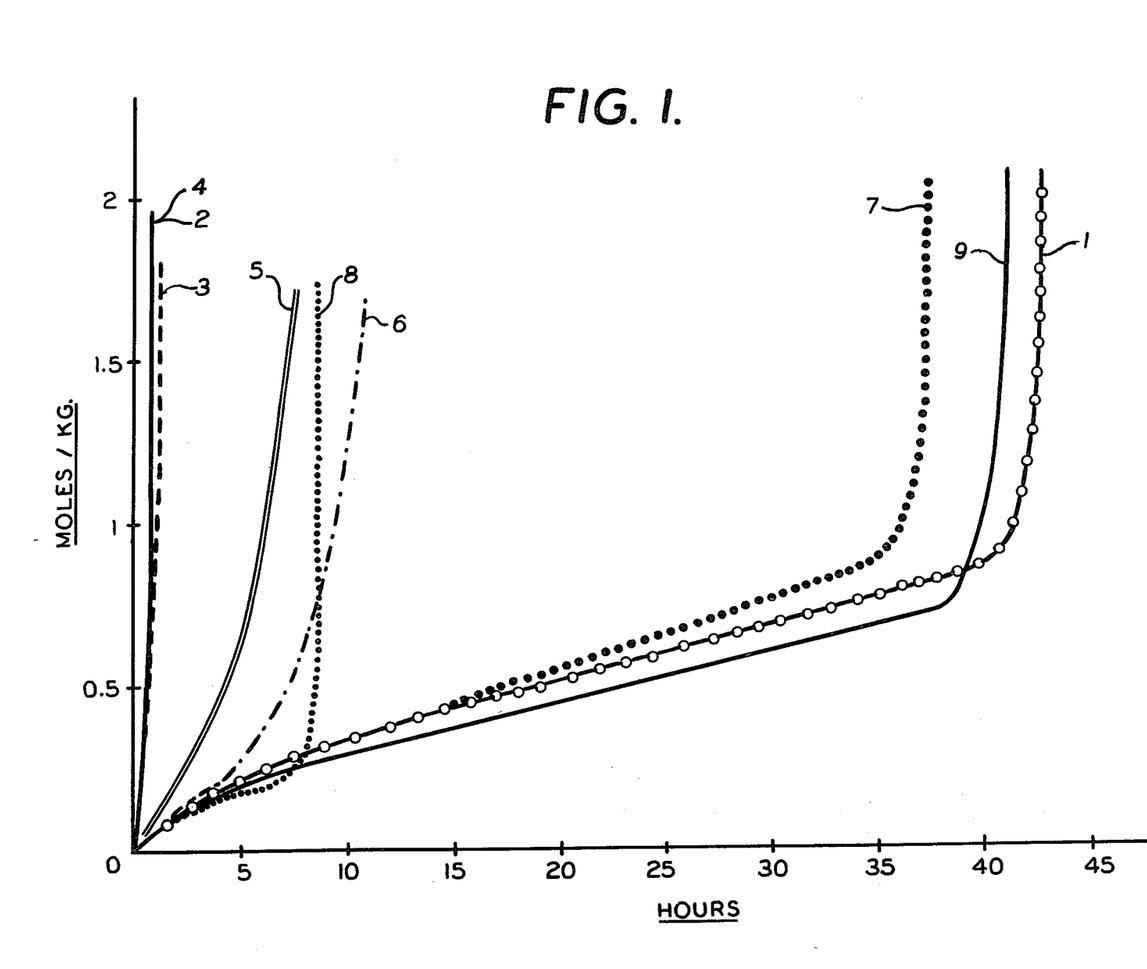
Figure 2:
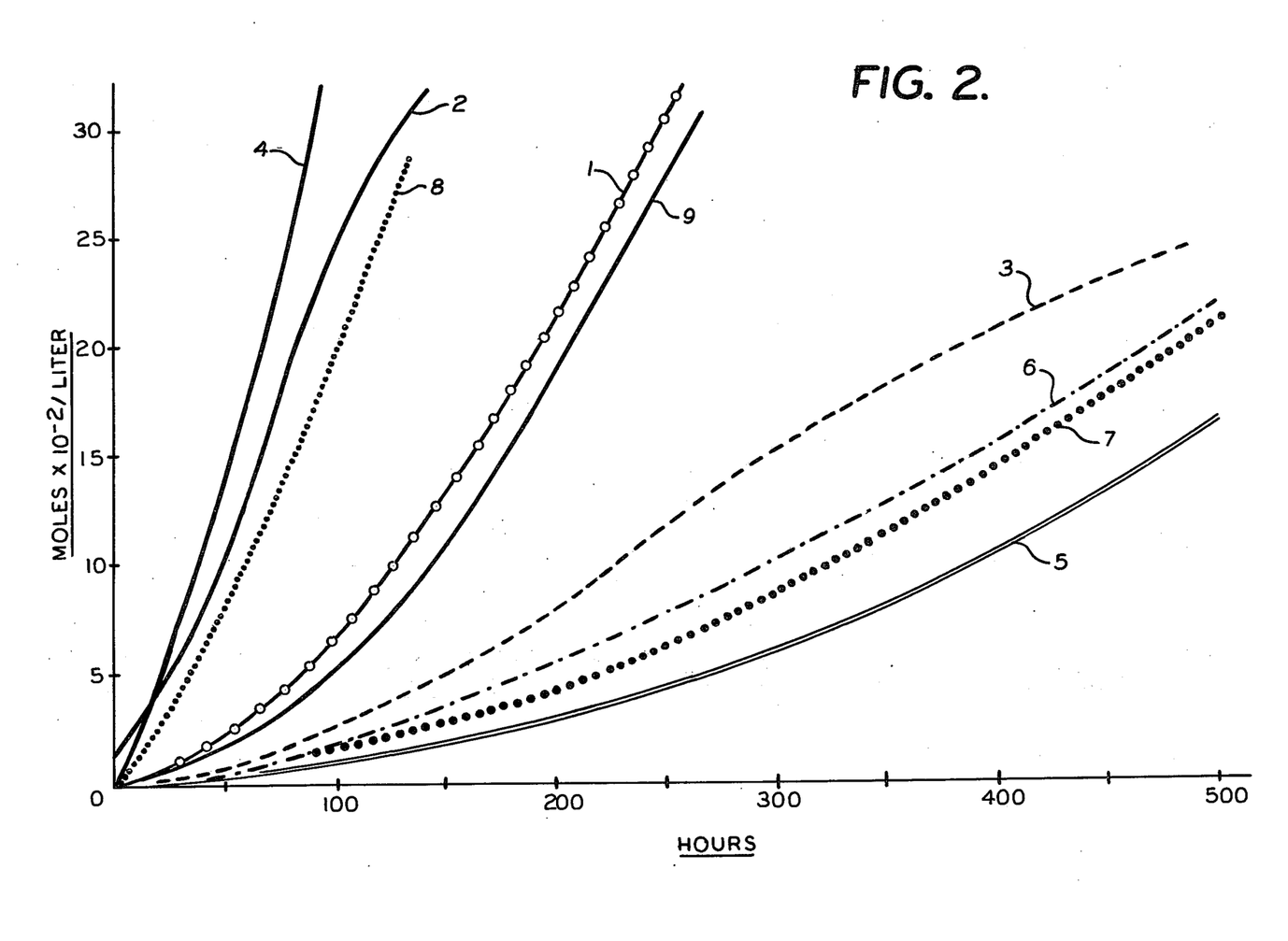

In accordance with the invention, it has now been discovered that there is a class of compounds which, when admixed with the vinyl or vinylidene polymer that has been made photodegradable by the presence of one or more of the above described transition metal compounds, are capable of having their thermal stability increased without altering to any appreciable degree their photodegradability. Consequently, it is possible to obtain polymeric compositions that possess a high thermal stability and develop a fast rate of photodegradation.

This class of compounds which is capable of thermally stabilizing the polymer without reducing the photodegrading action of the transition metal compounds are the chlorinated quinonic compounds of the formula (I)

wherein: $X_1$ is hydrogen, Cl, a $C_1$-$C_{18}$ alkyl group, or a $C_1$-$C_{21}$ thioalkyl, alkoxy, aryloxy, alkylcarboxy, arylcarboxy or aryl sulfonoxy group;

$X_2$ and $X_3$ each independently have the same definition as $X_1$, or together constitute a bivalent radical of the formula:

in which $Z_1$, $Z_2$, $Z_3$ and $Z_4$, each independently have the same definition as $X_1$.

Thus, it is an object of the invention, and the invention provides, photodegradable and thermostable polymeric compositions comprising:

a. a polymer consisting of monomeric units of the formula:

(II)

wherein $R_1$ and $R_2$ are independently selected from the group consisting of hydrogen, $C_1$-$C_3$ alkyl, $C_6$-$C_{12}$ aryl, $C_6$-$C_{12}$ cycloalkyl and chlorine;

b. at least one compound of a transition metal having an atomic number between 21 and 30, 40 and 47 and 57 and 79 inclusive, said compound being soluble in said polymer and possessing a photodegrading action on the polymer; and c. least one compound of the formula:

(I)

wherein $X_1$, $X_2$ and $X_3$ are as defined above.

Among the compounds of group (c) which are usable for the purposes of this invention, there may be mentioned tetrachloro-paraquinone (chloranil), 2-methyl-3,5,6-trichloro-paraquinone, 2-n-dodecyl-3,5,6-trichloro-paraquinone, 2-n-propyl-5,6-dichloro-paraquinone, 2,3-dichloronaphthoquinone, 2(2-benzoyl-5-octoxy-phenoxy)-3, 5,6-trichloro-paraquinone, 2-(2,5-di-t-butyl-phenoxy)-3, 5-6-trichloro-paraquinone, 2-N-pentoxy-3,5,6-trichloro-paraquinone, 2-ethoxy-3,5,6-trichloro-paraquinone, 2-(α-naphthoxy)-3,5,6-trichloro-paraquinone, 2-(pentachloro-phenoxy)-3,5,6-trichloro-paraquinone, 2-(p-toluene-sulfonoxy)-3,5,6-trichloro-paraquinone, 2-(n-dodecane-thio)-3,5,6-trichloro-paraquinone.

The preparation of the photodegradable and thermostable compositions according to the invention is carried out by adding the quinonic derivative and the transition metal compound, dissolved or dispersed in a liquid medium, to the polymer to be stabilized in the form of a powder, after which the solvent or dispersant liquid is allowed to evaporate from the homogeneous mixture thereby obtained.

Alteratively, the quinonic derivative and the transition metal compound may be added to the molten polymer, using conventional machines that are used for the preparation and processing of polymeric compositions.

There may also optionally be added to the polymer, either before or after addition of the quinonic derivatives and the transition metal compounds, one or more lubricating agents, plasticizing agents, inert fillers and pigments. In addition, conventional thermostabilizing agents may also be added, provided that they are used in such quantities as to not negatively influence the photodegrading action of the above mentioned transition metal compounds. The quinonic compounds usable for the purposes of the invention, belong substantially to the known class of derivatives of chloro-paraquinone and naphthochloro-paraquinone, the preparation of which is commonly carried out by a substitution reaction of one or more of the chlorine atoms of the quinonic or naphthoquinonic derivative, with the sodium or lithium derivative of the organic groups which are desired to be introduced into the quinonic molecule. General methods for the preparation of such compounds may also be found in "Organische Chemie", Beilstein — Vol. VII, pages 636 and 724. The polymers that participate in the compositions of this invention, and which consist of monomeric units defined by the formula (II), include the homopolymers and copolymers of vinyl and vinylidene monomers of the formula:

wherein $R_1$ and $R_2$ are as defined above. Examples of such polymers and copolymers are polyethlene, polypropylene, polyisobutene, polystyrene, polyvinylcyclohexane, polyvinyl chloride, and ethylenepropylene copolymers.

The polymeric compositions according to the invention may contain one or more of the above-described transition metal compounds and one or more of the above-described quinonic compounds.

The amount of transition metal compound or mixture of such compounds present in the polymeric composition, varies depending on the desired photodegrading effect and on the nature of the transition metal or metals and of the anions bound to such metals. Generally, a total amount of such transition metal compounds between 0.001 and 5% by weight, preferably between 0.01 and 0.5% by weight based on the weight of the polymer, is suitable for causing a photodegrading effect at a satisfactory rate. The chlorinated quinonic compound is also added in amounts varying according to and depending on the nature of the transition metal and of the anion bound thereto.

In general the total amount of quinonic compound is between 0.05 and 5% by weight, preferably between 0.1 and 1% by weight based on the weight of the polymer.

The polymeric compositions obtained using the above described amounts of additives exhibit, in general, a high thermal stability and a photochemical degradation rate greater than those of compositions based on vinyl or vinylidene polymers, and which are rendered photodegradable by the addition of transition metal compounds and conventional thermostabilizers.

The properties of the polymeric compositions stabilized according to the present invention, were determined on films of the composition having thicknesses of 50-100μ. The thermooxidative stability of the film was also determined at 145° C. and at an oxygen pressure of 760 mmHg, taking as the stability value the period of time necessary for inducing thermooxidation, i.e., the time after which a rapid increase in the speed of the absorption of oxygen occurs. The thermal stability was also tested on the polymer powder containing the additives in accordance with the invention. The results obtained were similar to those obtained on the film, which shows that the hot processing necessary for obtaining the films from the polymer powder does not alter to any appreciable extent the stability of the composition. Figure (I) records the oxygen absorbing curves expressed in moles/kg. of polymer (ordinate) with time (abcissa) produced by polymeric compositions according to the invention.

The light degradation was observed by exposing the films to light in a Xenotest 450 apparatus built by Hanau and by determining on said films the variations in concentration of carbonyl groups by means of IR spectrometry, and the variation of the mechanical properties by means of a bending at break test. The choice of the film thickness was made on the basis of using thicknesses comparable with those of films usually used as packaging materials.

With films of greater thickness if is possible to observe the degradation of the mechanical properties with a higher degree of accuracy. Figure (II) records the curves relating to the variation with time of the content of carbonyl groups (ordinate) in (moles $\times 10^{-2}$)/(liter of polymer) in polymeric compositions according to the invention.

DESCRIPTION OF THE PREFERRED EMBODIMENTS

The invention will now be described in greater detail in the following examples, which are given merely for illustrative purposes.

EXAMPLE 1

5 grams of polyethylene of the low density type (M.I. = 2), in the form of a fine powder were admixed with 0.015 g. of chloranil and 0.005 g. of cobalt acetylacetonate. The mixing was carried out by adding to the polyethylene powder, 40 cc. of chloroform containing the chloranil and the cobalt acetylacetonate dissolved therein.

The mixture was then subjected to stirring at room temperature for 18 hours and then evaporated in vacuum under stirring in a rotating evaporation apparatus. Finally the mixture was dried for 30 minutes at 80° C. at a pressure of 0.1 mmHg.

The thus obtained powder was molded at 165° C. for 2 minutes in a press between two square steel plates (20 cm./side) and under a load of 15,000 kg. The films thereby obtained had a uniform thickness between 50 and 70 μ, and were homogeneous and practically colorless.

0.2 gram of the film, cut into pieces, was introduced into a cell of about 50 cc. wherein there was subsequently introduced an oxygen atmosphere (by repeated flushing of the cell with oxygen). The cell was connected to a device for measuring the oxygen and provided with a recorder for recording the volume of absorbed oxygen. This cell was then immersed in a thermostatically controlled bath maintained at 145° C ± 0.01° C.

The induction period was about 30 hours. The same test repeated on the powder before molding gave an induction period of 42 hours (see curve 1; FIG. I).

A few cut pieces of the film were mounted on special supports in a Xenotest 450 apparatus and exposed therein to the light of a Xenon lamp of 1600 W., filtered in such a way as to obtain an emission spectrum as close as possible to the solar spectrum of Xenon. The temperature in the exposure chamber was maintained at 50° ± 2° C., while the relative humidity was kept at 35 ± 5%. Film samples were drawn at intervals and the IR absorption at a wave length 1720 cm$^{-1}$ (corresponding to the absorption of the carbonyl groups) was measured.

In order to evaluate the concentration of the carbonyl groups, there was assumed a conventional number for the molar absorption coefficient equal to 300 1/mole.cm. Curve 1 in FIG. (II) represents the index of carbonyls in the film with the passage of time. The induction period was about 60 hours.

The brittleness of the film samples was tested by simple bending. The time within which the samples became brittle was about 250 hours.

For comparative purposes, by an analogous procedure, there was prepared a composition consisting of 5 g. of the same polyethylene powder, 0.005 g. of acetylacetonate cobalt and 0.015 g. of a conventional thermal stabilizer consisting of the (3,5-di-tert-butyl-4-hydroxyphenyl)propionate of pentaerythrite.

The period of thermal induction, measured on such a composition under analoguous conditions as those used for the preceding composition, was 136 hours The period of photooxidation induction, measured on film cuttings of a film prepared in a press and of a comparative composition, under the above-described conditions, was about 50 hours.

The time within which such a film became brittle measured by means of simple bending, was about 430 hours.

EXAMPLE 2-9

Proceeding as in Example 1, there was prepared by series of polyethylene films having the additives as shown in Table 1. In Table 1 are also recorded the values for the period of thermooxidization induction as well as the time required for becoming brittle under the action of light.

Curves 2 to 9 in FIG. (I) illustrate the oxygen absorption with passing time, while curves 2 to 9 in FIG. (II) show the course of the index in carbonyls in the obtained films.

TABLE 1

| Example | Metal compound (wt. % based on polymer) | Chloranil (wt. % based on polymer) | Other additives (wt.% based on the polymer) | Thermal Induction period (hrs.) | Time necessary for becoming brittle under light (hrs.) |
| --- | --- | --- | --- | --- | --- |
| 2 | *Co(acac)$_3$ | — | — | 0 | 345 |

TABLE 1-continued

| Example | Metal compound (wt. % based on polymer) | Chloranil (wt. % based on polymer) | Other additives (wt.% based on the polymer) | Thermal Induction period (hrs.) | Time necessary for becoming brittle under light (hrs.) |
| --- | --- | --- | --- | --- | --- |
| 3 | Co(acac)₃ 0.1 | — | — | 0 | 513 |
| 4 | Co(acac)₃ 0.01 | — | **BHT 0.02 | 0 | 240 |
| 5 | — | — | — | 5.6 | 1100 |
| 6 | — | 0.1 | — | 7.5 | 800 |
| 7 | — | 0.3 | — | 36.4 | 750 |
| 8 | Co(acac)₃ 0.1 | 0.1 | BHT 0.02 | 7.7 | 240 |
| 9 | Co(acac)₃ 0.01 | 0.3 | — | 39.3 | 362 |

*Co(acac)₃ = acetylacetonate of cobalt.
**BHT = 2,6-ditert-butylparacresol (thermal stabilizer).

EXAMPLES 10-15

Operating according to the procedures of Example 1, a series of films was prepared from polyethylene and containing one or more of the following additives as set forth in Table 2:

A. bis(2-benzoyl-5-octoxy-phenate)titanium dichloride;

B. ferric 2-benzoyl-5-octoxy-phenate;

C. bis(2,5-di-tert-butyl-3-hydroxybenzyl-ethylphosphate) titanium-dicyclopentadienyl;

D. ferric p-n-dodecylbenzene-sulphonate;

E. bis(2,5-di-tert-butyl-3-hydroxybensyl-ethylphosphate) dititanile;

(F)

2-(2-benzoyl-5-octoxy-phenoxy)-3,5,6-trichloroparaquinone.

The preparation of compound (F) was carried out by reacting 2-hydroxy-5-octoxy-benzophenone in methylalcohol solution with an approximately equimolar amount of tetrachloroparaquinone (chloranil) dissolved in benzene, in the presence of sodium metal and in a nitrogen atmosphere.

The tetrachloroparaquinone solution was added dropwise at about 50° C. to the solution of the benzophenone derivative, and the reaction mixture was allow to react for about 12 hours at 75° C. At the end of the reaction period, the precipitated sodium chloride was eliminated by filtering and the 2-(2-benzoyl-5-octoxy-phenoxy)-3,5,6-trichloroparaquinone was recovered by bringing the solution to dryness.

Table 2 records, for each example, the additives used, the thermal oxidation induction periods and the times required for the samples to become brittle under light.

TABLE 2

| Example | Metal compound (wt. % based on the polymer) | Quinone derivative (wt.% based on the polymer) | Period of thermal induction (hrs.) | Time necessary to become brittle under light (hrs.) |
| --- | --- | --- | --- | --- |
| 10 | (A) 0.3 | Chloranil 0.1 | 7 | 485 |
| 11 | (B) 0.1 | Chloranil 0.1 | 7 | 500 |
| 12 | (C) 0.1 + Co(acac)₃ 0.1 | Chloranil 0.3 | 15 | 430 |
| 13 | (D) 0.1 | Chloranil 0.3 | 7.3 | 690 |
| 14 | (E) 0.2 + Co(acac)₃ 0.1 | Chloranil 0.1 | 26.8 | 450 |
| 15 | Co(acac)₃ 0.1 | (F) 0.3 | 15.4 | 400 |

EXAMPLES 16-18

To a polyethylene (low density type, M.I. = 2), loaded with 2% by weight of titanium dioxide, were added, according to the same procedures followed in Example 1, the metal compound and the chlorinated quinone derivative, as reported in Table 3.

The mixture was molded into a film with a mean thickness of 100μ by extrusion and blowing at 180° C.

The time necessary for becoming brittle under light was determined on a sample of the film. For comparison purposes, the same value was measured on a similar polyethylene having 2% by weight of titanium dioxide, but no chlorinated quinone (Example 16).

TABLE 3

| Example | TiO₂ (wt. %) | Metal compound (wt. % based on the polymer) | Chloranil (wt.% based on the polymer) | Period necessary for becoming brittle under light (hrs.) |
| --- | --- | --- | --- | --- |
| 16 | 2 | — | — | 750 |
| 17 | 2 | Co(acac)₃ 0.08 | 0.3 | 390 |
| 18 | 2 | *(A) 0.3 | 0.1 | 390 |

*See Examples 10 - 15.

EXAMPLES 19-20

Operating as in Example 1, there was prepared a polypropylene film (M.I. = 3.5) having the additives indicated in Table 4. The experimental data obtained are compared in Table 4 with those of the same polypropylene without the additives.

TABLE 4

| Example | Metal compound (wt.% based on polymer) | Chloranil (wt.% based on the polymer) | Period for thermal induction (hrs.) | Time necessary for becoming brittle under light (hrs.) |
|---|---|---|---|---|
| 19 | — | — | 0 | 80 |
| 20 | Co(acac)₃ 0.1 | 0.3 | 7 | 65 |

EXAMPLES 21-49

The following chlorinated quinone derivatives were used:

G. chloranil (in quimolar admixture with anthracene as dispersant)
H. chloranil (in equimolar admixture with 1,2,4,5 tetramethyl-benzene as dispersant)
I. 2-n-pentoxy-3,5,6-trichloro-paraquinone
L. 2-ethoxy-3,5,6-trichloro-paraquinone
M. 2-(α-naphthoxy)-3,5,6 trichloro-paraquinone
N. 2-(pentachloro-phenoxy)-3,5,6-trichloro-paraquinone
O. 2-(p-toluene-sulfonoxy)-3,5,6-trichloro-paraquinone
P. 2-(2,5-di-t-butyl-phenoxy)-3,5,6-trichloro-paraquinone
Q. chloranil (in equimolar admixture with pyrene as dispersant)
R. 2-(n-dodecane-thio)-3,5,6-trichloro-paraquinone The quinone derivatives from (I) to (R) were prepared in the same way in which compound (F) was prepared, using respectively n-pentanol, ethanol, α-naphtol, pentachlorophenol, p-toluen sulfonic acid, 2,5-di-t.butyl phenol and n-dodecanthiol instead of 2-hydroxy-5-oxtoxy-benzophenone.

To a polyethylene (low density types, M.I. = 2), loaded with 2% by weight of titanium dioxide, were added, by mixing in a roller mill at a temperature of 120° C for three minutes, the metal compounds and the chlorinated quinone derivatives, as reported in Table 5.

By using the mixture thus obtained and operating according to the procedures of Example 1, a series of films was prepared with a mean thickness of 70-100 μ.

In Table 5 are recorded the values for the period of thermal induction as well as the time required for becoming brittle under the action of light.

TABLE 5

| Example | Metal compound (wt.% based on polymer) | Quinone derivative (wt.% based on polymer) | Period of thermal induction (hrs.) | Time necessary to become brittle under light (hrs.) |
|---|---|---|---|---|
| 21 | — | (G) 0.17 | 30.5 | 920 |
| 22 | Co(acac)₃ 0.1 | (G) 0.17 | 31 | 425 |
| 23 | *Co(bop) 0.3 | (G) 0.17 | 33.5 | 425 |
| 24 | **Fe(naph) 0.3 | (G) 0.17 | 2.3 | 170 |
| 25 | Co(bop) 0.3 + Fe(naph) 0.3 | (G) 0.17 | 42 | 160 |
| 26 | ***Fe(acac)₃ 0.2 + Fe(naph) 0.3 + Co(bop) 0.2 | (G) 0.17 | 3.5 | 170 |
| 27 | — | (H) 0.15 | 22 | 750 |
| 28 | Fe(naph) 0.1 | (H) 0.15 | 4.5 | 400 |
| 29 | — | (I) 0.3 | 35 | 750 |
| 30 | Co(acac)₃ 0.1 | (I) 0.3 | 30.7 | 450 |
| 31 | Co(bop) 0.3 | (L) 0.3 | greater than 55 | 330 |
| 32 | Co(bop) 0.1 | (L) 0.3 | greater than 55 | 500 |
| 33 | Fe(naph) 0.1 | (L) 0.3 | 19.5 | 420 |
| 34 | Fe(naph) 0.3 | (L) 0.3 | 9 | 360 |
| 35 | Co(acac)₃ 0.1 | (M) 0.3 | 20.8 | 450 |
| 36 | Fe(naph) 0.3 | (M) 0.3 | 6 | 400 |
| 37 | — | (N) 0.3 | 38.5 | 770 |
| 38 | Fe(naph) 0.3 | (N) 0.3 | 3 | 400 |
| 39 | — | (O) 0.3 | 23 | 550 |
| 40 | Co(acac)₃ 0.1 | (O) 0.3 | 5 | 350 |
| 41 | — | (P) 0.3 | greater than 26 | 920 |
| 42 | Co(acac)₃ 0.1 | (P) 0.3 | greater than 15 | 615 |
| 43 | — | (Q) 0.17 | 27 | 750 |
| 44 | Co(acac)₃ 0.1 | (Q) 0.17 | 17.3 | 500 |
| 45 | Fe(naph) 0.3 | (Q) 0.17 | 4.5 | 480 |
| 46 | Co(bop) 0.2 + Fe(naph) 0.3 | (Q) 0.17 | 8 | 500 |
| 47 | — | (R) 0.3 | greater than 70 | 920 |
| 48 | Fe(naph) 0.3 | (R) 0.3 | 15 | 365 |
| 49 | Fe(acac)₃ 0.15 + Fe(naph) 0.15 | (R) 0.3 | 6.5 | 350 |

*Co(bop) = 2-benzoyl-5-octoxy-phenate of cobalt "
**Fe(naph) = ferric naphthenate
***Fe(acac)₃ ferric acetylacetonate Variations and modifications can, of course, be made without departing from the spirit and scope of the invention.

Having thus described our invention, what we desire to secure by Letters and hereby claim is.

We claim:

1. A photodegradable and thermostable polymeric composition consisting essentially of
   a. a polymer consisting of monomeric units of the formula wherein R₁ and R₂ are independently selected from the group consisting of hydrogen, C₁-C₃ alkyl, C₆-C₁₂ aryl, C₆-C₁₂ cycloalkyl and chlorine;

b. 0.001 to 5% by weight, based on the weight of the polymer of at least one compound of a transition metal having an atomic number between 21 and 30, 40 and 47 and 57 and 79, inclusive and which is soluble in said polymer and endowed with photodegrading properites with respect to the polymer; and 0.05 to 5% by weight, based on the weight of the polymer of at least one quinonic compound of the formula.

wherein: X₁, X₂ and X₃ are independently selected from the group consisting of hydrogen, Cl, a C₁-C₁₈ alkyl group, or a C₁-C₂₁ thioalkyl, alkoxy, aryloxy, alkylcarboxy, arylcarboxy and arylsulfonoxy group.

2. A composition according to claim 1, wherein the polymer is polyethylene, polypropylene, polyisobutene, polystyrene, polyvinyl chloride or an ethylene-propylene copolymer.

3. A composition according to claim 1, wherein the quinonic compound is tetrachloro-p-quinone, 2-methyl-3,5,6-trichloro-p-quinone, 2-n-propyl-5,6-dichloro-p-quinone, 2,3-dichloronaphthoquinone, 2-(2-benzoyl-5-octoxy-phenoxy)-3,5,6-trichloro-p-quinone, 2-n.pentoxy-3,5,6-trichloro-p-quinone, 2-ethoxy-3,5,6-trichloro-p-quinone, 2-(α-naphtoxy)-3,5,6-trichloro-p-quinone, 2-(pentachloro-phenoxy)-3,5,6-trichloro-p-quinone, 2-(p.toluene-sulfonoxy)-3,5,6-trichloro-p-quinone, 2-(n.dodecane-thio)-3.5, 6 trichlore-p-.quinone.

4. A composition according to claim 2, wherein the quinonic compound is tetrachloro-p-quinone, 2-methyl-3,5,6-trichloro-p-quinone, 2-n-propyl-5,6-dichloro-p-quinone, 2,3-dichloronaphthoqinnone, 2-(2-2-benzoyl-5-octoxy-phenoxy)-3,5,6-trichloro-p-quinone, 2-n.pentoxy-3,5,6-trichloro-p-quinone, 2-ethoxy-3,5,6-trichloro-p-quinone, 2-(α-naphtoxy)-3,5,6-trichloro-p-quinone, 2-2-(α-naphtoxy)3,5,6-trichloro-p-quinone, 2-(pentachloro-phenoxy)-3,5,6-trichloro-p-quinone, 2-(p.toluene-sulfonoxy)-3,5,6-trichloro-p-quinone, 2-(n.dodecane-thio)-3,5,6 trichloro-p-quinone.

5. A film formed from the composition according to claim 1.

6. A film according to claim 5 and having a thickness of about 50–100μ.

7. A composition according to claim 1, wherein the amount of the compound of the transition metal is 0.01 to 0.5% and the amount of the quinonic compound is 0.1 to 1%.

8. In a composition comprising a polymer or copolymer formed from vinyl or vinylidene monomers and an amount of a transition metal compound sufficient to impart photodegradabilty to the composition, an improvement comprising an amount of a quinonic compound of the formula:

wherein: $X_1$, $X_2$ and $X_3$ are independently selected from the group consisting of hydrogen, Cl, a $C_1$–$C_{18}$ alkyl group, or a $C_1 14$ $C_{21}$ thioalkyl, alkoxy, aryloxy, alkylcarboxy and arylcarboxy group which is sufficient to render the composition thermostable without thereby reducing its photodegradability.

9. The improvement according to claim 8, wherein the amount of said quinonic compound is 0.05 to 5% by weight based on the weight of the polymer or copolymer.

10. A composition according to claim 1, wherein the quinonic compound comprises equimolar amounts of tetrachloro-p-quinone and a compound selected from the group consisting of anthracene, 1,2,4,5-tetramethylbenzene and pyrene.

* * * * *

UNITED STATES PATENT OFFICE
CERTIFICATE OF CORRECTION

Patent No. 4,042,764        Dated August 16, 1977

Inventor(s) Francesco Gratani and Marco Binaghi

It is certified that error appears in the above-identified patent and that said Letters Patent are hereby corrected as shown below:

Column 1, line 33: "substances, Photosensitizing" should read -- substances. Photosensitizing --.

Column 3, lines 56-57: "2-N-" should read -- 2-n- --.

Column 4, line 3: "Alteratively," should read -- Alternatively,--

Column 5, line 31: "if" should read -- it --.

Column 6, line 46: "50 hours" should read -- 150 hours --; line 52: "prepared by" should read -- prepared a --.

Column 7, line 30: "E. bis(2,5-di-tert-butyl-3-hydroxybensyl-ethylphos-" should read -- E. bis(2,5-di-tert-butyl-3-hydroxybenzyl-ethylphos- --.

Column 8, line 22: "was allow" should read -- was allowed --.

Column 9, line 21: "quimolar" should read -- equimolar --; line 41: "hydroxy-5-oxtoxy-" should read -- hydroxy-5-octoxy- --.

Column 10, line 54: "0.05" should read -- c. 0.05 --.

Column 11, line 16: "2-(n.dodecane-thio)-3.5,6 trichlore-p-.quinone." should read -- 2-(n.dodecane-thio)-3,5,6 trichloro-p.quinone. --; line 20: "2-(2-2-" should read

UNITED STATES PATENT OFFICE
CERTIFICATE OF CORRECTION

Patent No. 4,042,764      Dated August 16, 1977

Inventor(s) Francesco Gratani and Marco Binaghi

It is certified that error appears in the above-identified patent and that said Letters Patent are hereby corrected as shown below:

-- 2-(2- --; line 24: "none, 2-2-(α-naphtoxy)3,5,6-trichloro-p-quinone, 2-" should read -- none, 2- --.

Column 12, line 3 of claim 8, after the formula: "$C_1 14C_{2.1}$" should read -- $C_1$-$C_{18}$ --.

Signed and Sealed this

Thirteenth Day of December 1977

[SEAL]

Attest:

RUTH C. MASON  
*Attesting Officer*

LUTRELLE F. PARKER  
*Acting Commissioner of Patents and Trademarks*